United States Patent
Manthey et al.

[11] Patent Number: 5,129,597
[45] Date of Patent: Jul. 14, 1992

[54] CEILING LUGGAGE COMPARTMENT COMBINATION FOR THE PASSENGER CABIN OF AN AIRCRAFT

[75] Inventors: Heinz Manthey, Hamburg; Hans Glimmann, Horneburg; Gustav Tyburski, Stade; Holger Schultz; Arne Probst, both of Hamburg; Georg Poppinga, Halstenbeck; Guenther Nocon, Buxtehude; Thomas-Mathias Bock, Hamburg; Guenter Schwertfeger, Buxtehude, all of Fed. Rep. of Germany

[73] Assignee: Deutsche Airbus GmbH, Hamburg, Fed. Rep. of Germany

[21] Appl. No.: 582,867

[22] PCT Filed: Feb. 3, 1990

[86] PCT No.: PCT/DE90/00074
§ 371 Date: Oct. 5, 1990
§ 102(e) Date: Oct. 5, 1990

[87] PCT Pub. No.: WO90/08674
PCT Pub. Date: Jan. 9, 1990

[30] Foreign Application Priority Data
Feb. 6, 1989 [DE] Fed. Rep. of Germany ....... 3903491
Feb. 14, 1989 [DE] Fed. Rep. of Germany ....... 3904375

[51] Int. Cl.⁵ .............................................. B64D 11/00
[52] U.S. Cl. ................................. 244/118.5; 244/119; 244/129.1; 362/62; 362/73
[58] Field of Search ................ 244/118.5; 362/62, 73, 362/74; 105/334

[56] References Cited

U.S. PATENT DOCUMENTS

| | | | |
|---|---|---|---|
| 2,198,579 | 4/1940 | Mayer | 362/74 |
| 2,582,738 | 1/1952 | Arenberg | 362/75 |
| 2,595,858 | 5/1952 | Kuhler | 105/329.1 |
| 3,535,505 | 10/1970 | Fenner | 362/219 |
| 4,799,631 | 1/1989 | Humphries et al. | 105/337 |
| 4,907,762 | 3/1990 | Bock et al. | 244/118.1 |

OTHER PUBLICATIONS

Aviation Week and Space Technology, Feb. 21, 1966 pp. 38-39.

Primary Examiner—Galen Barefoot
Attorney, Agent, or Firm—W. G. Fasse

[57] ABSTRACT

A ceiling baggage storage combination with lighting fixtures for an aircraft passenger cabin with two lengthwise aisles, has a central and two side baggage storage compartments. The ceiling is made of individual curved ceiling elements that extend approximately between the upper edges of the baggage storage compartments. The combination has tube-shaped fluorescent lamps arranged in a direction lengthwise to the aircraft on a respective ceiling element. The ceiling element (5, 11) is curved approximately as a parabola, whereby the less strongly curved zone extends toward the fluorescent lamp (6) which is partly covered by a cover, so that primarily indirect light enters into the cabin. A reflector (7) is arranged on the side of the fluorescent lamp (6) that faces away from and approximately parallel to the ceiling element (5, 11). The reflector (7) reflects the light emanating from the fluorescent lamp (6) primarily toward the ceiling element (5).

10 Claims, 5 Drawing Sheets

CEILING LUGGAGE COMPARTMENT COMBINATION FOR THE PASSENGER CABIN OF AN AIRCRAFT

FIELD OF THE INVENTION

The invention relates to a combination of luggage compartments and ceiling illumination in the passenger cabin of an aircraft.

BACKGROUND INFORMATION

Such combinations form the upper zone of the passenger cabin of an aircraft and essentially comprise baggage storage compartments and the ceiling which forms the upper zone of the interior paneling of the cabin. The fluorescent lamps for lighting the cabin are also arranged in the zone of the ceiling, or in the zone of the baggage storage compartments. A passenger cabin with two lengthwise aisles has one central and two side baggage storage compartments, each provided with lids. Fluorescent lamps with translucent covers are used for lighting. Two so-called light bands are arranged over each aisle. Due to space considerations, the side baggage storage compartments are constructed so that they can hold only small bags safely. Especially due to the relatively high number of fluorescent lamps, such combinations have a high production cost.

A fluorescent lamp system is known from U.S. Pat. No. 3,535,505 (Fenner) that is used, for example in large aircraft passenger cabins, wherein reflectors are arranged to eliminate end shadows. The abutting zones between two fluorescent lamps are thereby lit up. Fenner does not hint toward constructing the cabin ceiling and baggage storage compartments, so that the number of fluorescent lamps is reduced.

OBJECTS OF THE INVENTION

It is the object of the invention to construct a combination of the type mentioned above, so that one string of lights is saved along each lengthwise aisle, and so that the reduced illumination density resulting from using but one string of lights along each aisle is substantially compensated by optically efficient measures.

SUMMARY OF THE INVENTION

These objects have been achieved in a combination of the above type, by the following features. A ceiling element of the cabin ceiling is curved approximately as a parabola, whereby the less strongly curved zone extends toward a fluorescent lamp and the fluorescent lamp is partly covered by a light cover in such a way that essentially only indirect light enters into the cabin, and wherein a reflector is arranged on the side of the fluorescent lamp that faces away from the ceiling element so that the reflector reflects the light emanating from the fluorescent lamp toward the ceiling element.

It is a special advantage of the present construction that as a result of the elimination of half of all the fluorescent lamps, a corresponding number of power supply units is also eliminated. Not only does this reduce the production costs, but there is also a substantial weight reduction.

An advantage of the special arrangement of the light cover either formed by the central baggage compartment or by a separate element lies in the fact that the combination can be easily adapted to the structural conditions in the aircraft cabin.

A further advantage is provided by sloping the lids of the baggage compartments in such a way that the spacing between two lids facing each other increases toward the ceiling, whereby favorable angles of reflection are achieved. In addition, this feature introduces an optical impression of spaciousness toward the ceiling.

BRIEF DESCRIPTION OF THE DRAWINGS

In order that the invention may be clearly understood, it will now be described in detail, by way of example, with reference to the accompanying drawings, wherein.

DETAILED DESCRIPTION OF PREFERRED EXAMPLE EMBODIMENTS

Figure 1:
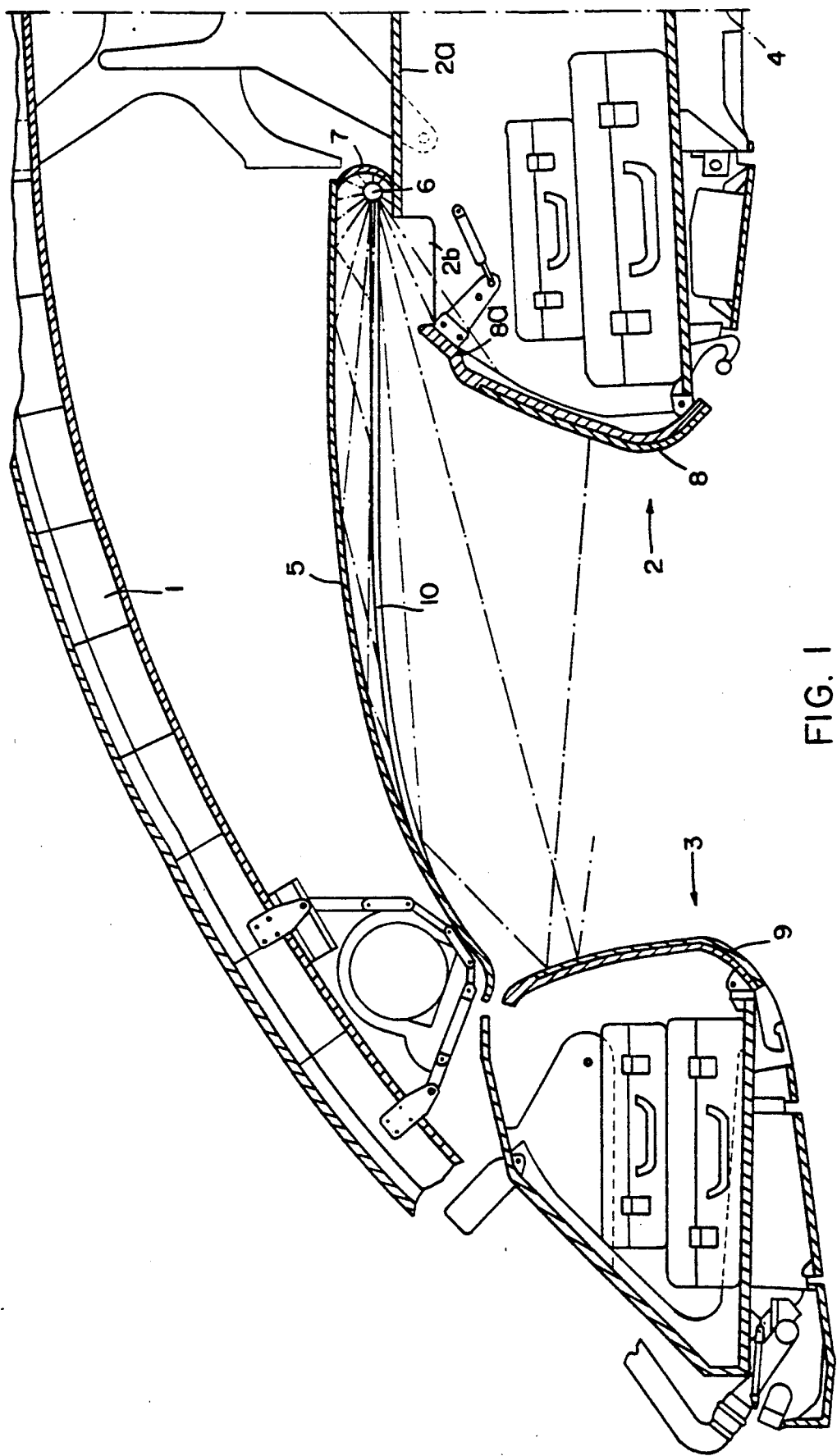
FIG. 1 is a sectional view through a ceiling baggage storage lighting combination with a row of centrally arranged fluorescent lamps extending above the central row of baggage compartments, shown with the compartment lids closed.
Figure 2:
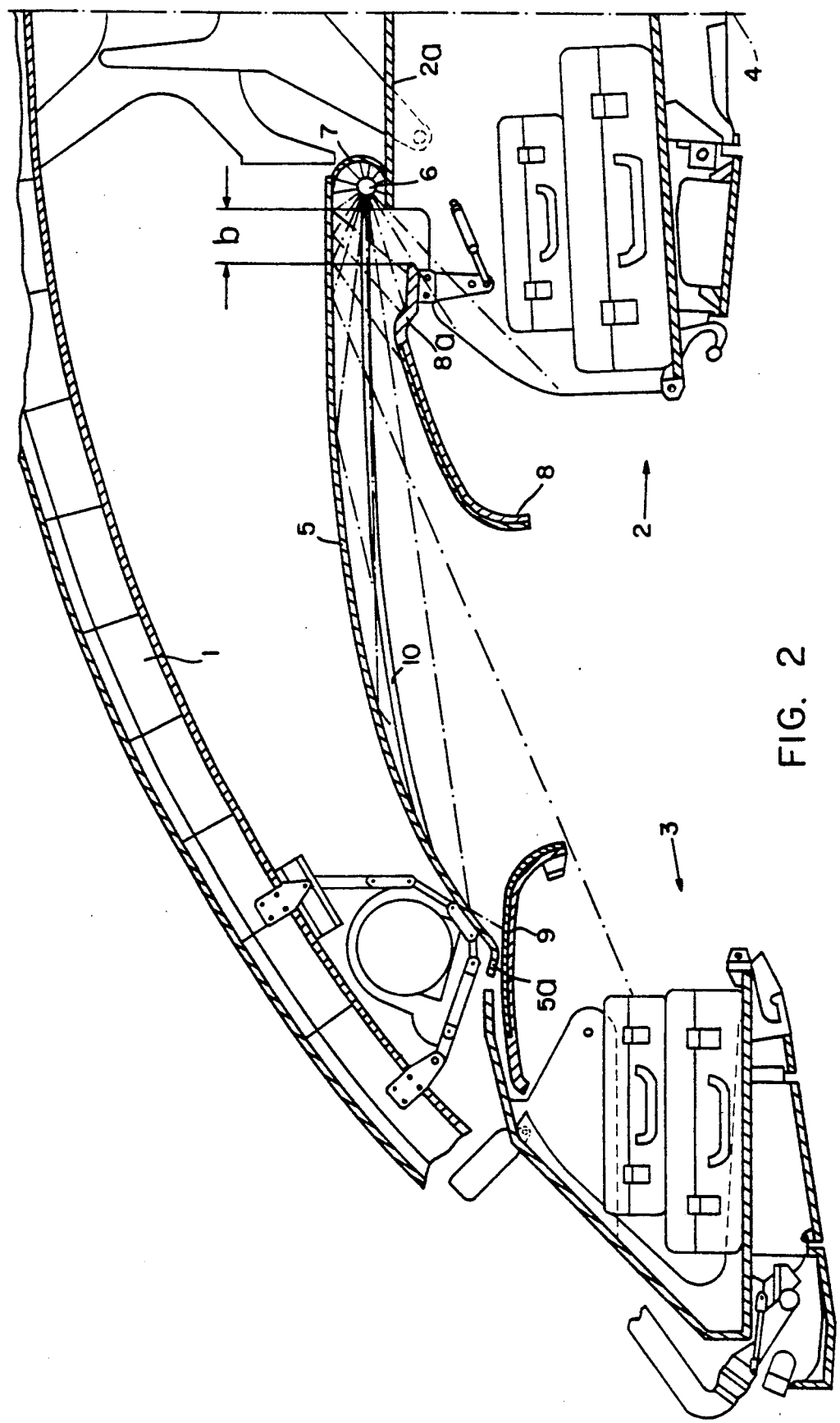
FIG. 2 shows the combination of FIG. 1 with the compartment lids in the open position.
Figure 3:
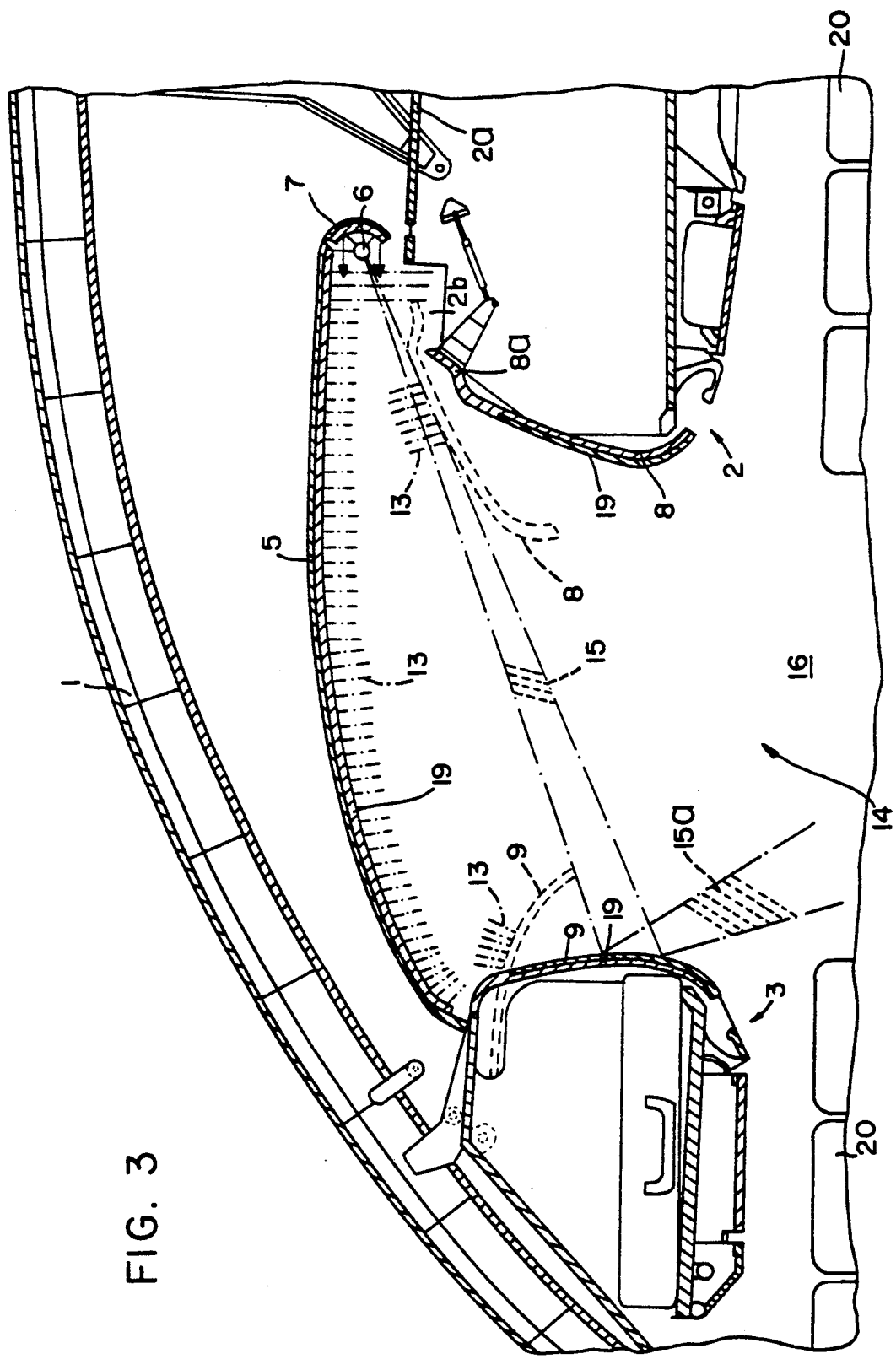
FIG. 3 is a sectional view corresponding to that of FIG. 1, illustrating the lighting or illumination conditions.
Figure 4:
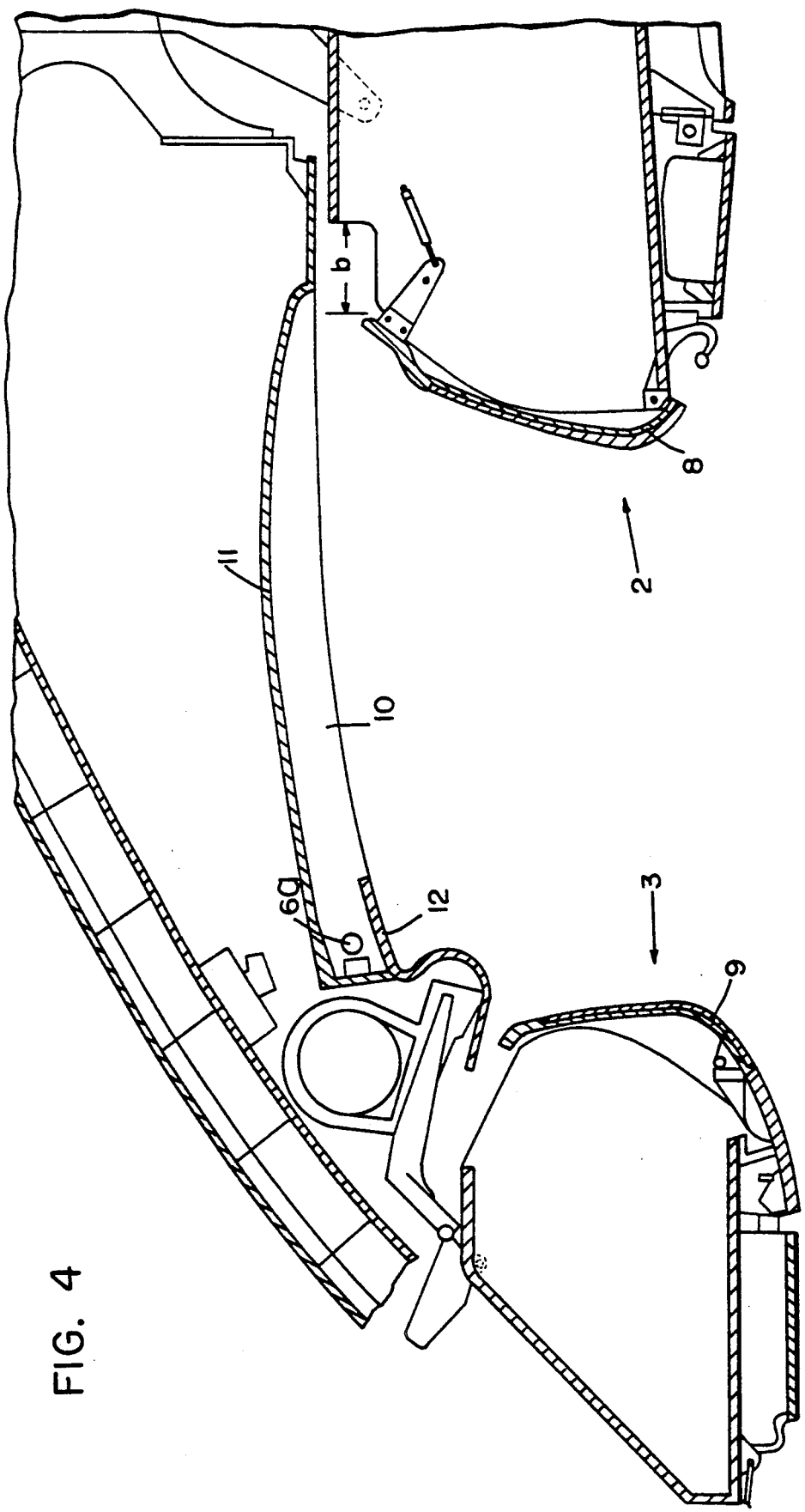
FIG. 4 is a combination with a laterally arranged row of fluorescent lamps positioned above the row of baggage compartments next to the windows.

FIG. 1 shows a sectional view in the flight direction of an aircraft passenger cabin, whereby only the left part of the upper cabin zone is visible. The symmetrical half of this zone lying to the right of the vertical central plane 4 of the cabin is not depicted. One sees a fuselage structure 1, a central baggage storage compartment 2 with a lid 8 and a side baggage storage compartment 3 with a lid 9. The zone between the baggage storage compartments 2, 3 is closed off toward the top by curved ceiling elements 5 that are joined lengthwise to one another. Just like the ceiling elements 5, a plurality of baggage storage compartments 2, 3 are also arranged in a row in a lengthwise direction of the cabin. Underneath each ceiling element 5, there is a lengthwise aisle. A fluorescent lamp 6 is arranged on each ceiling element 5 which essentially extends along the entire neighboring edge of the ceiling element 5. The ceiling element 5 is approximately curved as a parabola, whereby the less strongly curved zone extends toward the fluorescent lamp 6, whereby the lamp 6 is located near the open end opposite the focal end of the respective parabola. The path of light rays emanating from the lamp 6 is partially depicted, whereby it can be seen that the upper portion 8a of the lid 8 of the central baggage storage compartment 2 located below the fluorescent lamp 6 works as a light stop or cover, so that only the ceiling element 5 and the side baggage storage compartment 3 are directly lit up. For increasing the lighting or illumination efficiency, a reflector 7 is arranged on the side of the fluorescent lamp 6 that faces away from the ceiling element 5, more specifically, that faces toward the otherwise open end of the parabola as shown in FIGS. 1 to 3. The reflector 7 reflects the light emanating from the fluorescent lamp 6 toward the ceiling element 5. In order to further increase the effectiveness of the illumination, the lids 8 and 9 each have a sloping position, so that the spacing between the lids 8 and 9 increases toward the ceiling. In this manner, an indirect lighting of the cabin is achieved, whereby the light that falls down into the cabin essentially comes from the ceiling elements 5 and from the lids 8 and 9. Each ceiling element 5 is closed in a lengthwise direction of the aircraft, at its front and at its back, by a narrow edge 10 that extends downwardly as shown in FIGS. 1, 2, and 4.

FIG. 2 shows the combination of FIG. 1 with the above described baggage compartments 2 and 3, but with open compartment lids 8 and 9. The top of the baggage storage compartment 2 is closed off by a wall 2a, whereby there is a gap 2b having a width b between the front edge of the wall 2a and the upper edge of the compartment lid 8 in the open position as shown in FIG. 2, which shows that when the lids 8 and 9 are in the respective positions, the interiors of the baggage storage compartments 2, 3 are well lit, whereby the storage of baggage is made easier. In this manner, light falls through the gap 2b between the lid flap 8 and the wall 2a into the baggage storage compartment 2. The baggage storage compartment 3 is lit up by indirect light reflected by the ceiling element 5. In the case that the baggage storage compartment 2 is closed, the storage compartment 3 also receives direct light from the fluorescent lamp 6.

FIG. 3 shows a section similar to that of FIG. 1 with the fuselage structure 1, the baggage storage compartments 2 and 3 with the lids 8 and 9, the ceiling element 5, the fluorescent lamp 6, and the reflector 7. In the passenger room 14, passenger seats 20 are arranged, of which here only the upper zone of the backrests can be seen. Below the ceiling element 5 is the lengthwise aisle 16. The direct light 15 emanating from the fluorescent lamp 6 is reflected by the convex outer surface of the lid 9 as indirect or reflected light 15a on the aisle 16 of the passenger room 14. The fluorescent lamp 6 is arranged, so that directing light onto the outer surface of the lid 9 is still possible even if the lid 8 is open. Further, the light shining on the open lid 8 and on the open lid 9 is reflected to the ceiling elements 5 as shown at 13. When the lid flap 9 is open, it is assured that the interior of the baggage storage compartment 3 is lit up by the direct light 15.

The lids 8 and 9 and the ceiling element 5 have a coating 19, such that the brightness of the reflected indirect and direct light 13, 15 is determined by the degree of reflection of the coating 19. The reflector 7 is positioned in two axes to the fluorescent lamp 6, so that the corresponding light quantities are reflected onto the ceiling elements 5, 11 and onto the lids 8 and 9.

Another embodiment of the invention lies therein, that the reflector 7 can have the shape of a half shell or comprises differently shaped surface sections that reflect the light in different directions.

The fluorescent lamp 6 with the reflector 7 is suitably arranged above and far behind the right baggage storage compartment 2 as shown in FIGS. 1, 2, and 3, so that the lamp 6 cannot be directly seen when normal passenger eye levels are involved.

FIG. 4 shows another embodiment of the invention, whereby the fluorescent lamp 6a is arranged near the side baggage storage compartment 3. In this embodiment the fluorescent lamp 6a for each ceiling element 11 is again located opposite the focal end. The ceiling element 11 is curved approximately as a parabola, whereby the less strongly curved zone extends toward the fluorescent lamp 6a, and the lamp 6a is covered by a separate light stop or cover 12, so that essentially indirect light penetrates the cabin, whereby a reflector is again provided, but not shown here. The downwardly sloping position of the baggage lids 8 and 9 that is used for optical considerations, has an advantageous additional effect, especially at the side baggage storage compartment 3, in that the bags stored here have a higher stability. Therefore, there is less of a tendency for these bags to fall out of the baggage storage compartment 3.

Figure 5:
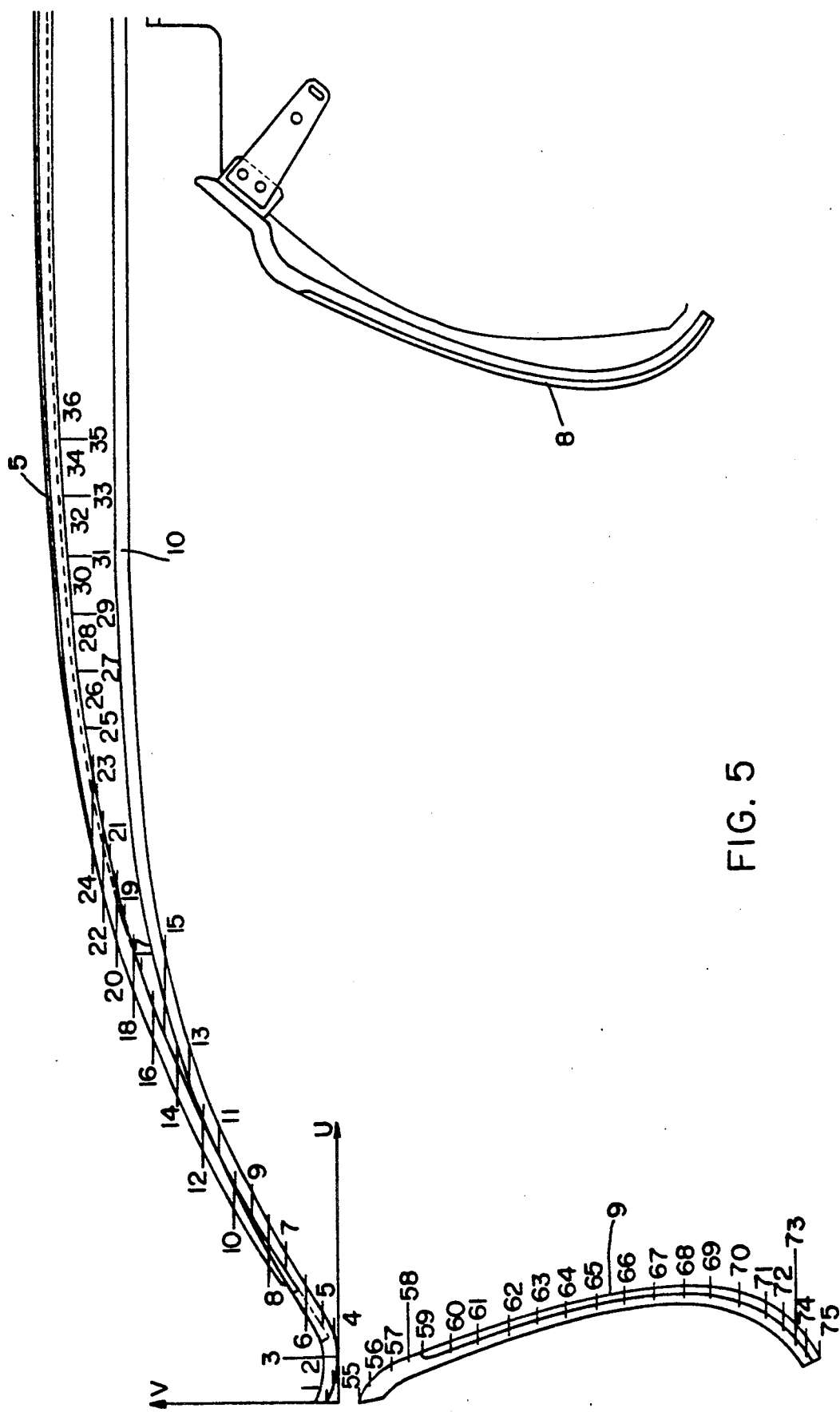
FIG. 5 shows the course of the curve of a ceiling element as used in FIG. 1, whereby the coordinates of a plurality of points along the curve are indicated in millimeters in the following table with reference to coordinates U, V shown in FIG. 5.

FIG. 5 shows plotting points P1 to P36 for the curve of the contour line of the ceiling element 5 according to FIGS. 1 and 2 with reference to the origin of the rectangular coordinate system having an ordinate V and an abscissa U. The shown curve was achieved experimentally and produces optimal lighting conditions in the ceiling baggage storage combination depicted in FIGS. 1, 2, and 3. FIG. 5 also shows plotting points P55 to P75 for the curve of the outer surface of the lid 9. The actual plotting points P1 to P36 and P55 to P75 as shown in said rectangular coordinate system V, U are listed in millimeters in the following TABLE.

It has been found that a parabolic curvature for the ceiling element 5 that satisfies the coordinates of the TABLE or is at least within a range of plus-minus 5% of the values in the TABLE provides optimal lighting conditions.

The above described solutions are not bound to a fluorescent lamp as the light source. All other suitable light sources can be utilized.

The invention is not confined to the described example embodiments. It extends to cover all embodiments that are possible in the scope of the claims.

TABLE

|  | U | V |
|---|---|---|
| (P1: | .000: | 11.039: |
| (P2: | 15.208: | 5.504: |
| (P3: | 39.146: | .000: |
| (P4: | 54.388: | 2.380: |
| (P5: | 65.208: | 13.072: |
| (P6: | 90.208: | 27.999: |
| (P7: | 115.208: | 43.592: |
| (P8: | 140.208: | 58.728: |
| (P9: | 165.208: | 73.280: |
| (P10: | 190.208: | 87.206: |
| (P11: | 215.208: | 100.466: |
| (P12: | 240.208: | 113.024: |
| (P13: | 265.208: | 124.854: |
| (P14: | 290.208: | 135.936: |
| (P15: | 315.208: | 146.259: |
| (P16: | 340.208: | 155.828: |
| (P17: | 365.208: | 164.650: |
| (P18: | 390.208: | 172.750: |
| (P19: | 415.208: | 180.154: |
| (P20: | 440.208: | 186.902: |
| (P21: | 465.208: | 193.031: |
| (P22: | 490.208: | 198.586: |
| (P23: | 515.208: | 203.612: |
| (P24: | 540.208: | 208.151: |
| (P25: | 565.208: | 212.248: |
| (P26: | 590.208: | 215.942: |
| (P27: | 615.208: | 219.271: |
| (P28: | 640.208: | 222.271: |
| (P29: | 665.208: | 224.974: |
| (P30: | 690.208: | 227.407: |
| (P31: | 715.208: | 229.598: |
| (P32: | 740.208: | 231.571: |
| (P33: | 765.208: | 233.345: |
| (P34: | 790.204: | 234.940: |
| (P35: | 815.208: | 236.374: |
| (P36: | 840.205: | 237.660: |
| (P55: | 6.377: | −18.330: |
| (P56: | 19.278: | −24.648: |

TABLE-continued

|  | U | V |
| --- | --- | --- |
| (P57: | 35.932: | −44.648: |
| (P58: | 41.262: | −58.229: |
| (P59: | 40.235: | −69.648: |
| (P60: | 49.164: | −94.648: |
| (P61: | 57.352: | −119.648: |
| (P62: | 64.817: | −144.648: |
| (P63: | 71.576: | −169.648: |
| (P64: | 77.644: | −194.648: |
| (P65: | 83.033: | −219.648: |
| (P66: | 87.755: | −244.648: |
| (P67: | 91.820: | −269.648: |
| (P68: | 95.235: | −294.648: |
| (P69: | 98.007: | −319.648: |
| (P70: | 96.218: | −344.648: |
| (P71: | 86.306: | −369.648: |
| (P72: | 74.127: | −385.525: |
| (P73: | 64.808: | −394.648: |
| (P74: | 53.489: | −404.648: |
| (P75: | 33.845: | −419.648: |

We claim:

1. A combination of ceiling luggage compartments and lighting fixtures for a passenger cabin of an aircraft, comprising two rows of luggage compartments spaced from each other by an aisle, ceiling elements (5, 11) bridging said aisle above said rows of luggage compartments, said ceiling elements having an approximately parabolic curvature with a curved focal end near one row of luggage compartments and with an open end opposite said focal end near the other row of luggage compartments, lighting means (6, 6a) positioned at said open end of said ceiling elements for directing light primarily toward said ceiling elements and partly toward said one row of luggage compartments, reflector means (7) positioned for closing said open end and reflecting light from said lighting means toward said ceiling elements, and cover means positioned for intercepting light from said lighting means to prevent direct light from entering into said aisle.

2. The combination of claim 1, wherein said open end of said parabolic curvature of said ceiling elements is located above said other row of luggage compartments, and wherein a portion (8a) of a luggage compartment in said other row forms said cover means for intercepting light.

3. The combination of claim 1, wherein said cover means comprise a separate cover element (12) positioned to intercept light that would otherwise enter directly into said aisle.

4. The combination of claim 1, wherein said luggage compartments comprise lids positioned to approximately face each other across said aisle, said lids sloping downwardly and towards said aisle so that a horizontal spacing between two lids facing each other increases toward said ceiling elements.

5. The combination of claim 4, further comprising a gap (2b) between a front edge of an upper ceiling wall (2a) and an upper edge of a respective compartment lid for light to directly pass through said gap into said respective compartment.

6. The combination of claim 4, wherein said lids of at least one of said two rows have a convex aisle facing surface positioned to receive direct light (15) from said lighting means and to reflect indirect light (15a) into said aisle.

7. The combination of claim 4, wherein said lids assume an open position wherein said lids reflect light toward said ceiling elements.

8. The combination of claim 4, wherein said lighting means are so positioned relative to said luggage compartments that direct light enters into said luggage compartments at least when said lids are open.

9. The combination of claim 1, wherein said parabolic curvature of said ceiling elements is experimentally determined for an optimal light reflection.

10. The combination of claim 1, wherein said lighting means comprise elongated fluorescent bulbs arranged in a column at said open end of said ceiling elements.

* * * * *